United States Patent [19]

Johansson

[11] 4,372,019
[45] Feb. 8, 1983

[54] METHOD OF MANUFACTURING PROJECTILES

[75] Inventor: Lennart Johansson, Karlskoga, Sweden

[73] Assignee: Aktiebolaget Bofors, Bofors, Sweden

[21] Appl. No.: 230,478

[22] Filed: Feb. 2, 1981

[30] Foreign Application Priority Data

Feb. 18, 1980 [SE] Sweden ............................. 8001265

[51] Int. Cl.³ ..................... B21K 21/06; B21D 39/00
[52] U.S. Cl. .................................... 29/1.23; 228/160; 228/162
[58] Field of Search ................ 29/1.21, 1.22, 1.23; 228/107, 108, 109, 160, 162

[56] References Cited

U.S. PATENT DOCUMENTS

| | | | |
|---|---|---|---|
| 270,101 | 1/1883 | Nordenfelt | 29/1.23 |
| 338,840 | 3/1886 | Lorenz | 29/1.23 |
| 394,673 | 12/1888 | Bischoff et al. | 29/1.22 |
| 2,353,693 | 7/1944 | Church | 29/1.2 |
| 2,532,397 | 12/1950 | Evans et al. | 29/1.2 |
| 3,160,952 | 12/1964 | Corney et al. | 228/107 |
| 3,292,253 | 12/1966 | Rossner et al. | 228/107 |
| 3,358,349 | 12/1967 | Rosen | 228/107 |
| 3,364,561 | 1/1968 | Barrington | 228/108 |
| 3,541,658 | 11/1970 | Andersson | 228/107 |
| 4,129,061 | 12/1978 | Bedall et al. | 29/1.23 |

Primary Examiner—James M. Meister
Assistant Examiner—Paul M. Heyrana
Attorney, Agent, or Firm—Pollock, Vande Sande & Priddy

[57] ABSTRACT

The present invention relates to a method used for manufacturing projectiles or other ammunition units such as artillery shells, and specifically to fastening a driving band (10) and/or a pipe cap (13) to the projectile body (1). In order to obtain a strong joint between the driving band (10) and the projectile body (1) as well as a simple manufacturing method the driving band (10) with the pipe cap (13) are fastened to the rear part of the projectile body (1) simultaneously, i.e. in the one and same working operation, by means of explosive cladding. The driving band and pipe cap material (7) formed as a "cup" is disposed on the rear part of the projectile body after which detonating explosive (8) with a very high pressure joins the material (7) to the outer surface of the projectile body. The clad material is then machined to form the driving band (10), circumferential grooves (14, 15) and the pipe cap (13) into their desired dimensions.

3 Claims, 3 Drawing Figures

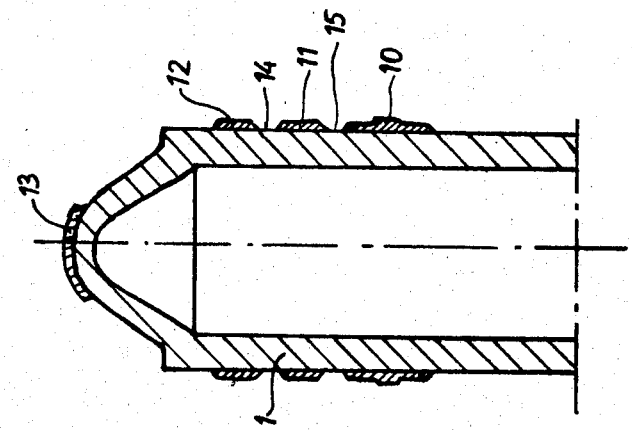
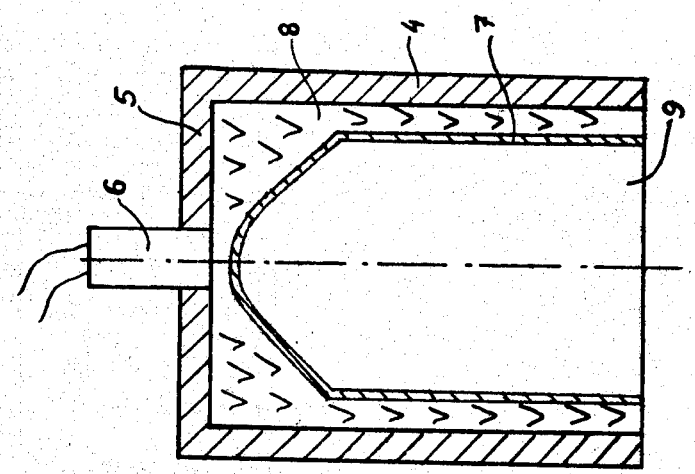
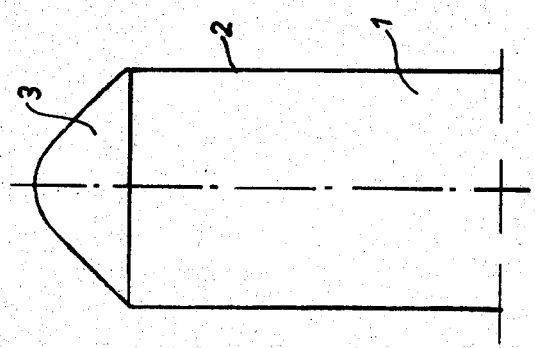

METHOD OF MANUFACTURING PROJECTILES

BACKGROUND OF THE INVENTION

The present invention relates to a method of fastening a driving band and/or a pipe cap to the body of a projectile or other ammunition unit, such as an artillery shell.

Projectiles with large calibres are generally provided with a driving band fastened to the rear part of the projectile to obturate the bore of the barrel and to cause the projectile to rotate in the barrel as it is fired therefrom due to the barrel rifling. The driving band is generally made of a softer material than the rest of the shell, mainly to reduce the wear of the barrel rifling.

In order to prevent the propellant gases to reach the payload of the projectile or other ammunition unit it is previously known to provide the rear surface of the projectile with a shielding cover such as for instance a plate or cap, a so called pipe cap, designed to resist the gas pressure and high temperatures produced in the barrel on firing.

When manufacturing projectiles the driving band and the pipe cap are usually fastened separately on the projectile body. For fastening the driving band on the body of an artillery shell it is common to use press fits or a combination of press and shrinkage fits. Due to new requirements for increased velocities and ranges, however, there is a risk that such conventional press or shrinkage fits are not sufficiently strong to retain the driving band in its place on account of the forces which influence the driving band on firing from the barrel.

New methods of fastening a driving band to the envelope surface of a projectile have therefore been developed. One such new method is fasteneing the driving band to the envelope surface of the projectile by means of friction welding.

Pipe caps are usually made of metal, for instance steel, and are used for protecting the surface of the projectile on which the propellant gases are actuating and they have previously been fastened by means of conventional welding or soldering.

Both these methods are relatively expensive, however. Even if the friction welding of a driving band in many applications gives a satisfactory strength, there is a risk that the driving band will come loose when it is exposed to extremely high speeds during firing. Furthermore the fastening of the pipe cap presents difficulties especially for projectiles in which the rear surface, for aerodynamical reasons, is cap shaped.

SUMMARY OF THE INVENTION

The present invention relates to a new method of fastening a driving band as well as a pipe cap to the projectile body. According to the invention the driving band as well as the pipe cap are fastened to the rear part of the projectile by means of explosive cladding.

By the explosive cladding technique a fit is obtained which has outstanding strength properties. This new method makes it possible to finish the machining of the driving band and the pipe cap after they have been fastened. Even the circumferential grooves for mounting the cartridge part of the shell can be machined directly in the material which is disposed on the projectile body by the explosive cladding.

Another advantage of the explosive cladding method is the fact that the driving band and the pipe cap can be fastened to the projectile body simultaneously, i.e. in the one and same work operation. Preferably the material from which the driving band and the pipe cap are to be formed is cup shaped and disposed on the rear part of the projectile body by means of explosive cladding and thereafter the driving band, the circumferential grooves (if any) and the pipe cap are machined to its desired dimensions.

A method in accordance with this invention allows a rapid and efficient manufacturing of projectiles and shells. It is easy to adapt the manufacturing to different types of shells just by changing the shape of the "cup" of the cladding material which is disposed on the projectile or shell body, so that its original shape more or less corresponds to the shape of the rear part of the shell body.

DESCRIPTION OF THE FIGURES

A method according to the invention will now be described in more detail with reference to the accompanying drawings in which FIG. 1 shows the rear part of a projectile body, FIG. 2 a device for carrying out the explosive cladding according to the invention and FIG. 3 a sectional view of the rear part of a projectile or ammunition unit after the explosive cladding and the finished machining.

DESCRIPTION OF THE PREFERRED EMBODIMENT

FIG. 1 shows schematically the rear part of an unfinished projectile or shell body 1 with an envelope surface 2 to which a driving band should be fastened and a rear surface 3 to which a pipe cap should be applied and after which the projectile periphery is machined to its final dimensions. As illustrated in the figure the rear surface 3 is cap-shaped which has previously complicated the application of protective plates or pipe caps.

FIG. 2 shows schematically a device for explosive cladding of the driving band and the pipe cap to the rear part of the projectile body. The device comprises an outer cylindrical metal casing 4 which is open at the bottom but closed at the top by an end surface 5 on which an electric igniter 6 is arranged. A closed sleeve 7 or "cup", which is made of the material from which the driving band as well as the pipe cap should be made, is disposed inside the metal casing 4. The shape of the sleeve 7 then essentially corresponds to the shape of the rear part of the unfinished projectile or shell body. The space between the casing 4 and the sleeve 7 is filled with a common explosive 8.

When manufacturing the projectile its rear part is inserted into the cavity 9 of the device illustrated in FIG. 2. Then the electric igniter is actuated and the explosive 8 is detonated. Due to the high pressure which is developed when the explosive 8 is detonated, the sleeve 7 is moved against and bonded with a tremendous force to the projectile body. The explosive cladding makes an extremely strong joint between the cladding material 7 and the projectile body so that the final machining of the projectile can be carried out on the explosive clad material without any risk that the material should come loose.

FIG. 3 illustrates schematically a finished projectile body, i.e. after the explosive cladding and the final machining. As illustrated in the figure parts of the explosive cladding material have been removed by the final machining so that only the driving band 10, circumferential rings 11, 12 for mounting the cartridge to the projectile body and the pipe cap 13 remain. All these parts have been applied on the projectile body in the one and same working moment by means of this explosive cladding technique. By machining the explosive cladding material the driving band, the circumferential grooves and the pipe cap obtain their final dimensions.

As the explosive cladding technique gives such an extremely strong joint, it is then also possible to make even the circumferential grooves 14, 15 for assembling the cartridge by through cutting in the clad material. Previously the grooves were cut in the projectile body itself. It is an advantage to machine the grooves in the clad material as the remaining rings 11 and 12 can serve as a driving band.

The invention is not limited to the above-mentioned embodiment but can be modified within the scope of the accompanying claims. It is evident that the method can be used even in such cases when only a driving band should be applied on the projectile body. It is also evident that the design of the device in FIG. 2 for carrying out the method and the shape of the clad material can be varied depending on the form and dimensions of the final product.

I claim:

1. A method for manufacturing an ammunition unit comprising:
    forming a shell body of said ammunition unit having at one end a surface shaped for receiving a pipe cap, and a longitudinal surface portion for receiving a driving band;
    locating a sleeve material a distance apart from said shell body surfaces, said sleeve material having a shape substantially conforming to the shape of said shell body;
    applying an explosive force against said sleeve material in a direction for cladding said sleeve material to said shell body whereby a clad surface is formed on said shell body; and
    removing portions of said cladding material to form a pipe cap at said one end, and to form a driving band on said longitudinal surface, whereby an ammunition unit is produced having a pipe cap and driving band which can withstand explosive forces produced during firing of said ammunition unit.

2. The method of claim 1 further comprising:
    removing additional cladding material on said portion to produce circumferential grooves adjacent said driving band.

3. The method of claim 1 wherein said explosive force is applied by the steps of:
    locating a metal casing a distance apart from said sleeve material to form a space for receiving an explosive mixture, said casing having at one end thereof an igniter;
    filling said space with an explosive mixture; and
    actuating said electric igniter whereby said explosive mixture is detonated creating said explosive force.

* * * * *